US008774041B2

(12) United States Patent
Akay et al.

(10) Patent No.: US 8,774,041 B2
(45) Date of Patent: Jul. 8, 2014

(54) PROXIMITY-BASED WIRELESS HANDSHAKING FOR CONNECTION ESTABLISHMENT

(75) Inventors: Enis Akay, San Francisco, CA (US); Richard T. Chang, Sunnyvale, CA (US); Meng-Ta Hsu, Miaoli (TW); Yu-Chang Hu, Hsinchu (TW); Philip F. Kearney, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 188 days.

(21) Appl. No.: 13/411,139

(22) Filed: Mar. 2, 2012

(65) Prior Publication Data

US 2013/0229930 A1 Sep. 5, 2013

(51) Int. Cl.
*H04W 24/00* (2009.01)
*H04W 52/02* (2009.01)

(52) U.S. Cl.
CPC ................... *H04W 52/0245* (2013.01)
USPC ............. 370/252; 709/204; 709/229; 455/68; 455/461; 455/41.1

(58) Field of Classification Search
CPC ............. H04L 63/101; H04L 63/0492; H04N 21/4126
USPC ............ 370/252; 709/204, 229; 455/41.1, 68, 455/461
See application file for complete search history.

(56) References Cited

U.S. PATENT DOCUMENTS

| 8,266,027 | B2 | 9/2012 | Moritz et al. |
| 8,316,438 | B1 | 11/2012 | Bush et al. |
| 2003/0220765 | A1 | 11/2003 | Overy et al. |
| 2004/0068744 | A1* | 4/2004 | Claussen et al. ................ 725/81 |

(Continued)

FOREIGN PATENT DOCUMENTS

| CN | 1422008 A | 6/2003 |
| WO | 03220765 | 11/2003 |

(Continued)

OTHER PUBLICATIONS

Balaban, Dan "New Apple NFC Patent Gives the iPhone a Key Role in Device Sharing", Forthwrite Media SARL and NFC Times, http://www.nfctimes.com/news/new-apple-nfc-patent-casts-iphone-roledevice-sharing-hub Obtained from the internet May 6, 2011. Apr. 6, 2010, 6 pages.

(Continued)

*Primary Examiner* — Dang Ton
*Assistant Examiner* — Mewale Ambaye
(74) *Attorney, Agent, or Firm* — DeLizio Gilliam, PLLC

(57) ABSTRACT

A first network device can implement functionality to establish a proximity-based wireless connection with a second network device. It can be determined whether the second network device is within a threshold detection distance from the first network device based on a signal strength associated with RF signals received from the second network device or based on detecting RF saturation at the first network device. Device credentials associated with the first network device can be transmitted to the second network device at a reduced transmit power level in response to determining that the second network device is within the threshold detection distance from the first network device. A communication link can be established between the first network device and the second network device based, at least in part, on the device credentials associated with the first network device and device credentials received from the second network device.

26 Claims, 6 Drawing Sheets

(56) References Cited

U.S. PATENT DOCUMENTS

| | | |
|---|---|---|
| 2004/0203365 A1 | 10/2004 | Yamamoto et al. |
| 2006/0056636 A1 | 3/2006 | Schrum, Jr. et al. |
| 2006/0094402 A1 | 5/2006 | Kim |
| 2006/0187865 A1 | 8/2006 | Sakai |
| 2007/0242729 A1 | 10/2007 | Quinn et al. |
| 2007/0249288 A1* | 10/2007 | Moallemi et al. .............. 455/68 |
| 2008/0013601 A1 | 1/2008 | Lind et al. |
| 2008/0106372 A1 | 5/2008 | Chang |
| 2008/0171559 A1 | 7/2008 | Frank et al. |
| 2008/0184345 A1* | 7/2008 | Kaechi ............................. 726/5 |
| 2010/0015919 A1 | 1/2010 | Tian |
| 2010/0081385 A1 | 4/2010 | Lin et al. |
| 2010/0082784 A1 | 4/2010 | Rosenblatt et al. |
| 2010/0130131 A1 | 5/2010 | Ha et al. |
| 2010/0181373 A1 | 7/2010 | Murakami et al. |
| 2010/0274859 A1* | 10/2010 | Bucuk ........................... 709/206 |
| 2010/0306394 A1 | 12/2010 | Brown et al. |
| 2010/0318712 A1 | 12/2010 | Boldyrev et al. |
| 2011/0092155 A1 | 4/2011 | Piemonte et al. |
| 2011/0314153 A1 | 12/2011 | Bathiche et al. |
| 2012/0042087 A1 | 2/2012 | Berg et al. |
| 2012/0271908 A1 | 10/2012 | Luna et al. |
| 2012/0317194 A1 | 12/2012 | Tian |
| 2013/0204998 A1 | 8/2013 | Russell et al. |

FOREIGN PATENT DOCUMENTS

| | | |
|---|---|---|
| WO | 2006187865 | 8/2006 |
| WO | 2008184345 | 7/2008 |
| WO | 2012170051 | 12/2012 |
| WO | 2013131029 | 9/2013 |

OTHER PUBLICATIONS

Clark, Sarah "Stanford Researchers Develop First Android NFC P2P Apps," Near Field Communications World, http://www.nearfieldcommunicationsworld.com/2011/01/31/35785/stanford-researchers-develop-first-android-nfc-p2p-apps/ Obtained from Internet on May 6, 2011. Jan. 31, 2011, 3 pages.

Co-pending U.S. Appl. No. 12/943,556, filed Nov. 10, 2010.

International Search Report and Written Opinion—PCT/US2013/028713—ISA/EPO—Aug. 30, 2013.

Co-pending U.S. Appl. No. 13/157,941, filed Jun. 10, 2011.

PCT Application No. PCT/US11/46906 International Preliminary Report on Patentability, May 13, 2013, 12 pages.

PCT Application No. PCT/US11/46906 International Search Report, Dec. 15, 2011, 13 pages.

U.S. Appl. No. 12/943,556 Final Office Action, Feb. 25, 2013, 23 Pages.

U.S. Appl. No. 12/943,556 Office Action, Sep. 25, 2012, 17 pages.

U.S. Appl. No. 13/157,941 Non-Final Office Action, Mar. 19, 2013, 12 Pages.

U.S. Appl. No. 13/157,941 Final Office Action, Aug. 19, 2013, 15 pages.

\* cited by examiner

US 8,774,041 B2

PROXIMITY-BASED WIRELESS HANDSHAKING FOR CONNECTION ESTABLISHMENT

BACKGROUND

Embodiments of the inventive subject matter generally relate to the field of communication networks and, more particularly, to proximity-based wireless handshaking for connection establishment.

Wireless network devices typically broadcast messages (e.g., beacon messages, probe request messages, etc.) to advertise their presence in a wireless communication network. When one wireless network device identifies (or discovers) another wireless network device, the devices may initiate operations to establish a communication link. The wireless network devices can exchange device communication capability information and security information, negotiate parameters for establishing the communication link, and eventually establish the communication link between the two wireless network devices.

SUMMARY

Various embodiments for proximity-based establishment of wireless communication connections are disclosed. In one embodiment, a first wireless network device determines a signal strength associated with one or more RF signals received from a second wireless network device of a wireless communication network. It is determined whether the second wireless network device is within a threshold detection distance from the first wireless network device based on the signal strength associated with the second wireless network device. Device credentials associated with the first wireless network device are transmitted to the second wireless network device at a reduced transmit power level in response to determining that the second wireless network device is within the threshold detection distance from the first wireless network device. A communication link is established between the first wireless network device and the second wireless network device based, at least in part, on the device credentials associated with the first wireless network device and device credentials associated with the second wireless network device received from the second wireless network device.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
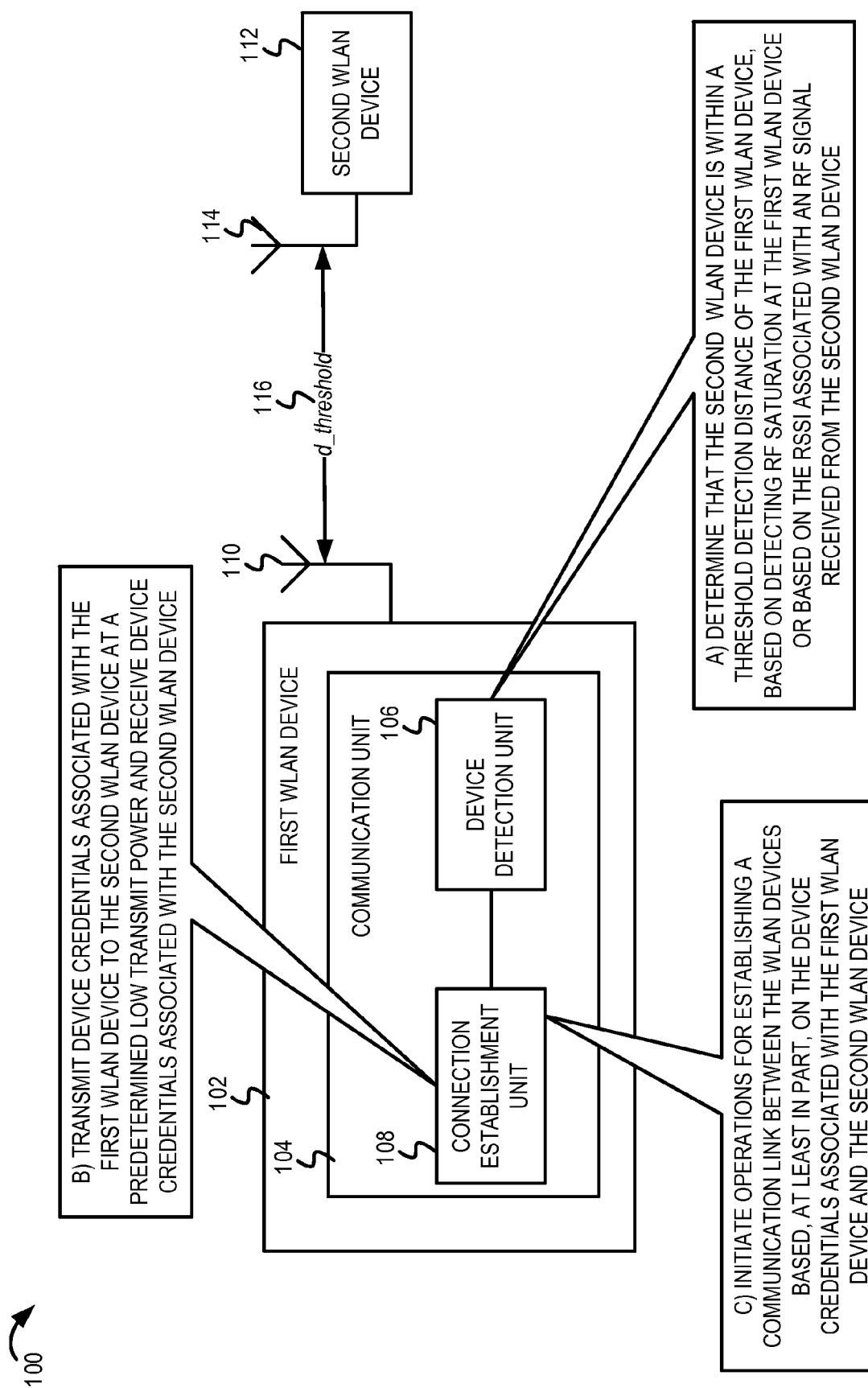
FIG. 1 is a block diagram illustrating a proximity-based connection establishment mechanism in a wireless communication network.

The description that follows includes exemplary systems, methods, techniques, instruction sequences, and computer program products that embody techniques of the present inventive subject matter. However, it is understood that the described embodiments may be practiced without these specific details. For instance, although examples refer to a proximity-based wireless handshaking connection establishment mechanism for wireless local area network (WLAN) devices (e.g., 802.11n compatible devices), embodiments are not so limited. In other embodiments, other wireless standards and devices (e.g., WiMAX, Bluetooth®, etc.) can implement the proximity-based wireless handshaking mechanism for connection establishment described herein. In other instances, well-known instruction instances, protocols, structures, and techniques have not been shown in detail in order not to obfuscate the description.

A wireless network device typically scans communication channels to identify and to establish a communication link with another wireless network device. Depending on the communication protocol, operations for establishing the communication link can comprise device discovery procedures, connection and service discovery procedures, etc., which typically require some user input. For example, to establish a communication link between a laptop and a wireless printer, a user may need to locate a connection setup menu on the laptop, cause the laptop to detect wireless network devices in its vicinity, identify the wireless printer with which the communication link is to be established, provide security information associated with the wireless printer, prompt the laptop to initiate connection procedures with the wireless printer, etc. As another example, setting up a communication link between two mobile phones to share media (e.g., pictures, movies, etc.) may similarly involve various steps, which may be unknown to the mobile phone users. It may be time consuming and complicated, from the user's standpoint, to determine how to initiate discovery, security information exchange, and connection procedures, locate hidden icon/menu options, and accordingly set up the communication link between the devices.

In some embodiments, a wireless network device can be configured to automatically establish a communication link with another wireless network device when the two wireless network devices are within a threshold detection distance of each other. The user(s) can indicate the intent to connect a first and a second wireless network device by moving the two wireless network devices within the threshold detection distance of each other. The first and the second wireless network devices can each detect the presence of the other wireless network device and can automatically initiate operations for establishing the communication link. The first wireless network device can detect the presence of the second wireless network device within the threshold detection distance by analyzing the received signal strength indicator (RSSI) associated with radio frequency (RF) signals received from the second wireless network device or by determining whether the RF signals received from the second wireless network device caused RF saturation at the first wireless network device. Likewise, the second wireless network device can detect the presence of the first wireless network device within the threshold detection distance. The first and the second wireless network devices can then decrease their respective transmit power to a predetermined low transmit power level to exchange device credentials. The first and the second wireless network devices can use the exchanged device credentials to establish the communication link between the two wireless network devices. Such a mechanism for automatically establishing a secure communication link between two wireless network devices by moving the two wireless network devices within the threshold detection distance of each other can reduce or eliminate the number of manual steps that are usually performed (e.g., searching for hidden icon/menu options, searching for other wireless network devices, selecting the appropriate wireless network device, entering security information, manually entering Wi-Fi simple configuration (WSC) personal identification number (PIN), etc.) for establishing the communication link. Furthermore, configuring the wireless network devices to exchange device credentials at the low transmit power level can ensure proper reception, detection, and decoding at the receiving wireless network device and can improve security of the wireless network devices (e.g., by minimizing eavesdropping).

FIG. 1 is a block diagram illustrating a proximity-based connection establishment mechanism in a wireless communication network 100. The wireless communication network 100 comprises WLAN devices 102 and 112. The WLAN device 102 comprises a communication unit 104. The communication unit 104 can implement protocols and functionality to enable WLAN communication with the other WLAN devices in the wireless communication network 100. The communication unit 104 comprises a device detection unit 106 and a connection establishment unit 108. The WLAN device 102 is coupled with an antenna 110. The WLAN device 112 is coupled with an antenna 114. Although not depicted in FIG. 1, it is noted that the WLAN device 112 can also comprise a communication unit, a device detection unit, and a connection establishment unit. In some implementations, the WLAN devices 102 and 112 can each be electronic devices with WLAN communication capabilities, such as a laptop computer, a tablet computer, a mobile phone, a smart appliance, a camera, a gaming console, a desktop computer, an access point, or other suitable electronic devices. In some implementations, in an ad-hoc wireless mode, the WLAN devices 102 and 112 can establish an ad-hoc communication link to communicate with each other. In other implementations, in a peer-to-peer (P2P) wireless mode, one of the WLAN devices 102 can be a P2P group owner (P2PGO), and the other WLAN device 112 can be a client station attempting to connect to the P2PGO. In other implementations, in an infrastructure wireless mode, one of the WLAN devices 102 can be an access point, and the other WLAN device 112 can be a client station attempting to connect to the access point.

In some implementations, to initiate handshaking operations for establishing a communication link between the WLAN device 102 ("first WLAN device) and the WLAN device 112 ("second WLAN device"), a user can bring the first and the second WLAN devices in close proximity to each other (e.g., so that the first WLAN device 102 and the second WLAN device 112 are within a threshold detection distance 116 of each other). In one implementation, the threshold detection distance 116 may be a predetermined distance (e.g., 5 cm). In another implementation, the threshold detection distance 116 may be dynamically configurable based on the wireless communication network 100, the communication protocol(s) being used, interference/attenuation on the communication channels, orientation of the antenna 110, etc. In some implementations, the user can move the WLAN devices so that the antenna 110 of the first WLAN device 102 is within the threshold detection distance 116 of the antenna 114 of the second WLAN device 112. For example, the position or location of the antennas on the WLAN devices may be indicated (e.g., by a sticker or logo) and the user may move the logo-facing side of each of the WLAN devices towards each other to initiate handshaking operations for establishing the communication link. In some implementations, one of the WLAN devices (e.g., the first WLAN device 102) may comprise a service to share/provide (e.g., a picture to be transmitted) and may be designated as a service provider. The other WLAN device (e.g., the second WLAN device 112) may be configured to access the services or content provided by the service provider and may be designated as the service consumer or a service client. In some implementations, the service provider 102 can be a P2P device that transmits messages requesting to establish a P2P communication link with the service consumer 112. In another implementation, the service provider 102 can be an access point that transmits messages advertising its presence and capabilities to enable other devices (e.g., the service consumer 112) to connect and request services. The WLAN devices 102 and 112 can execute operations further described in stages A-C to automatically detect proximity between the two WLAN devices and to establish a communication link between the proximate WLAN devices.

At stage A, the device detection unit 106 of the first WLAN device 102 determines that the second WLAN device 112 is within a threshold detection distance 116 of the first WLAN device 102. In some implementations, the device detection unit 106 can detect the second WLAN device 112 based on comparing the RSSI associated with one or more RF signals (e.g., beacon messages, probe messages, etc.) received from the second WLAN device 112 against a predetermined RSSI threshold, as will be described below in FIGS. 2-3. In some implementations, the device detection unit 106 can detect the second WLAN device 112 based on determining that one or more RF signals received from the second WLAN device 112 caused RF saturation at the first WLAN device 102, as will be described below in FIGS. 4-5. If the RSSI associated with the second WLAN device 112 is greater than the RSSI threshold or if RF saturation is detected at the first WLAN device 102, this can indicate that the second WLAN device 112 is proximate to the first WLAN device 102.

At stage B, the connection establishment unit 108 transmits device credentials associated with the first WLAN device 102 to the second WLAN device 112 at a predetermined low transmit power and receives device credentials associated with the second WLAN device 112. As will be further described in FIGS. 2-5, after the device detection unit 106 determines that the second WLAN device 112 is within the threshold detection distance 116 of the first WLAN device 102, the connection establishment unit 108 can decrease the transmit power associated with the first WLAN device 102 to the predetermined low transmit power level. The predetermined low transmit power level may be calculated based, at least in part, on the ability of the first WLAN device 102 to transmit at low power levels, the lowest power level at which the first WLAN device 102 can transmit, path loss in the wireless communication network 100, the minimum RSSI which can be detected at the second WLAN device 112, and/or other such factors. The connection establishment unit 108 can transmit device credentials associated with the first WLAN device 102 at the predetermined low transmit power. The device credentials associated with the first WLAN device 102 can include device identification information, security information, one or more communication parameters and protocols supported by the first WLAN device 102, and other such information that can enable the second WLAN device 112 to authenticate and establish a communication link with the first WLAN device 102. The connection establishment unit 108 can also receive device credentials associated with the second WLAN device 112. The device credentials associated with the second WLAN device 112 can include device identification information, security information, one or more communication parameters and protocols supported by the second WLAN device 112, and other such information that can enable the first WLAN device 102 to authenticate and establish a communication link with the second WLAN device 112. It is noted that the second WLAN device 112 may also decrease its transmit power and may transmit its device credentials to the first WLAN device 102 at a predetermined low transmit power level associated with the second WLAN device 102.

At stage C, the connection establishment unit 108 initiates operations for establishing a communication link between the WLAN devices 102 and 112 based, at least in part, on the device credentials associated with the WLAN devices 102 and 112. In some implementations, as will be described in FIGS. 2-3, the connection establishment unit 108 can increase the transmit power associated with the first WLAN device 102 from the predetermined low transmit power level to a higher transmit power level, prior to executing the operations for establishing the communication link. In other implementations, as will be described in FIGS. 4-5, the connection establishment unit 108 can increase the transmit power associated with the first WLAN device 102 after the first and the second WLAN devices are moved away from each other. After the connection establishment unit 108 establishes the communication link, the first WLAN device 102 and the second WLAN device 112 can communicate and exchange data via the established communication link. For example, the first WLAN device 102 and the second WLAN device 112 can be laptops, smart phones, tablets, or other suitable electronic devices that can exchange/share content (e.g., file, pictures, video, audio, etc.) with other devices after the communication link is established. As another example, the first WLAN device 102 can be a laptop, the second WLAN device 112 can be a wireless printer, and the laptop 102 can transmit data to the printer 112 for printing after the communication link is established.

Figure 2:
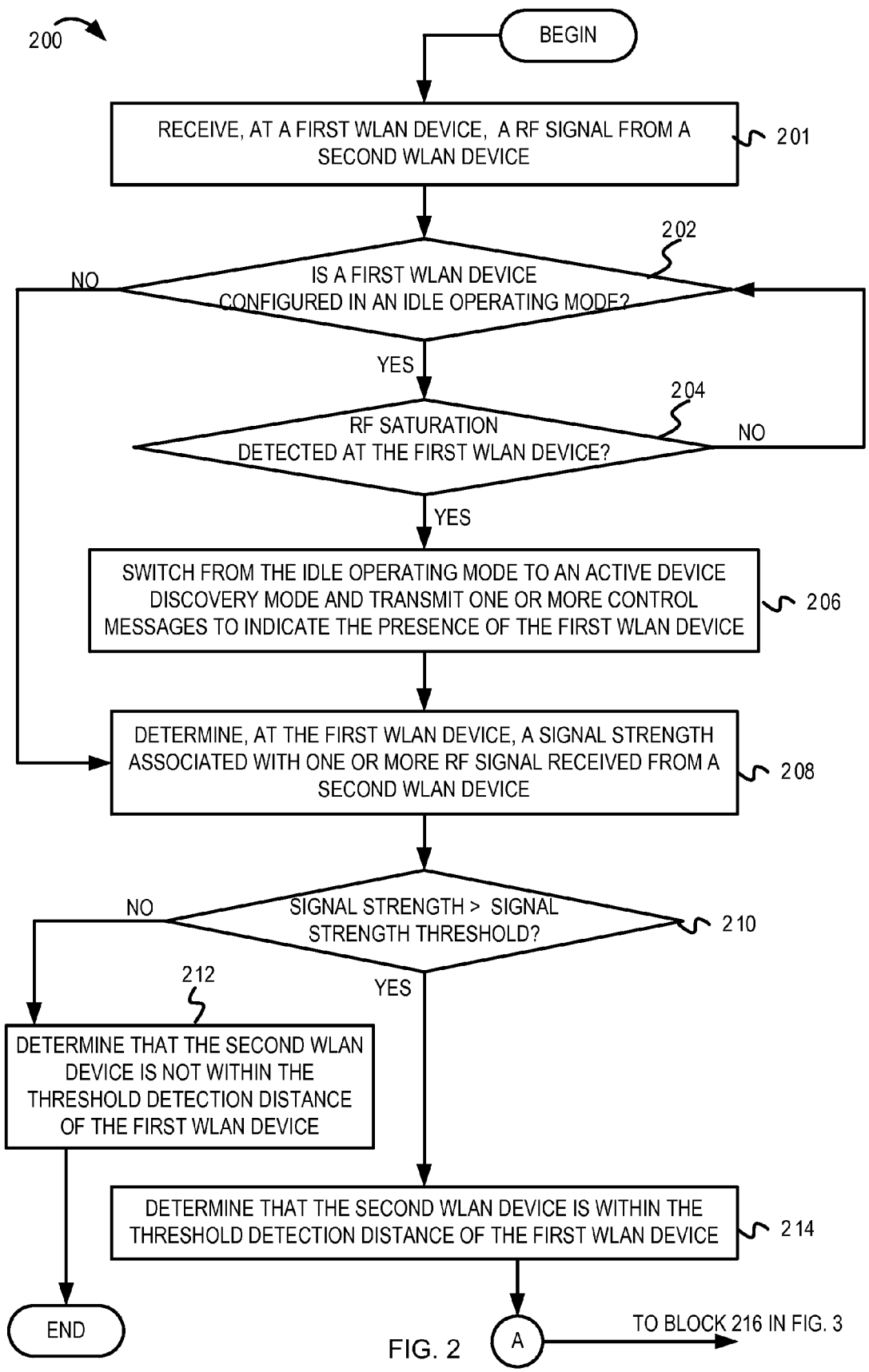
FIG. 2 is a flow diagram illustrating example operations of one embodiment of a proximity-based connection establishment mechanism.
Figure 3:
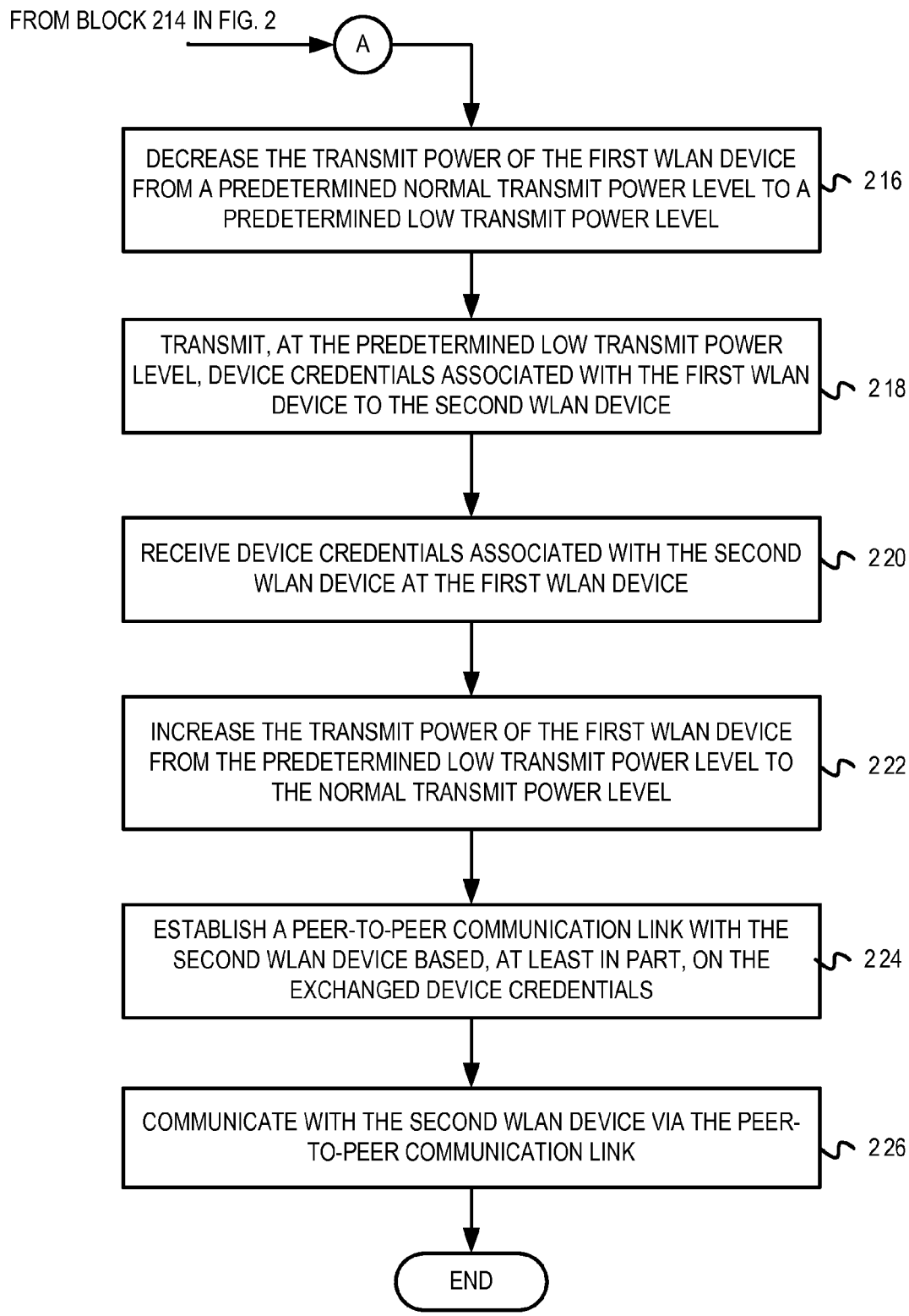
FIG. 3 is a continuation of FIG. 2 and also illustrates example operations of one embodiment of a proximity-based connection establishment mechanism.

FIG. 2 and FIG. 3 depict a flow diagram ("flow") 200 illustrating example operations of one embodiment of a proximity-based connection establishment mechanism. The flow 200 begins at block 201 in FIG. 2.

At block 201, a first WLAN device receives an RF signal from a second WLAN device. With reference to the example of FIG. 1, the first WLAN device 102 of the communication network 100 can receive an RF signal from the second WLAN device 112. In some implementations, the first WLAN device 102 and the second WLAN device 112 can be configured in a P2P operating mode and can execute operations described herein to establish a peer-to-peer communication link. The RF signal can be a beacon message, a probe response message, or another suitable control/data message. The flow continues at block 202.

At block 202, it is determined whether the first WLAN device of a wireless communication network is configured in an idle operating mode. With reference to the example of FIG. 1, the connection establishment unit 108 of the first WLAN device 102 can determine (e.g., by checking an operating mode status flag) whether the first WLAN device 102 is configured in the idle operating mode. In some implementations, one or more processing components of the first WLAN device 102 may be disabled in the idle operating mode. In other implementations, in the idle operating mode, one or more processing components of the first WLAN device 102 may operate at a low power. In some implementations, the antenna 110 and other communication components that enable the first WLAN device 102 to receive transmissions from other WLAN devices may be enabled and operational. In some implementations, the connection establishment unit 108 can periodically determine whether the first WLAN device 102 is configured in the idle operating mode. In other implementations, the connection establishment unit 108 can determine whether the first WLAN device 102 is configured in the idle operating mode in response to receiving an RF signal from another WLAN device. If the first WLAN device is configured in the idle operating mode, the flow continues at block 204. Otherwise, the flow continues at block 208.

At block 204, it is determined whether RF saturation is detected at the first WLAN device. For example, the connection establishment unit 108 can determine whether RF saturation is detected at the first WLAN device 102, in response to determining that the first WLAN device 102 is configured in the idle operating mode. As described herein, transmissions from a WLAN device (e.g., the second WLAN device 112) can cause RF saturation at the first WLAN device 102 depending on the distance between the first WLAN device 102 and the second WLAN device 112. For example, when the antenna 110 of the first WLAN device 102 and the antenna 114 of the second WLAN device 112 are within the threshold detection distance 116, transmissions (e.g., probe responses, probe requests, etc.) from the second WLAN device 112 can cause RF saturation at the first WLAN device 102. If RF saturation is detected at the first WLAN device 102 when the first WLAN device 102 is configured in the idle operating mode, this can indicate that the first WLAN device 102 should switch to the active device discovery mode, as will be described below in block 206. Operations for detecting RF saturation will be further described in blocks 402 and 404 of FIG. 4. If RF saturation is detected at the first WLAN device, the flow continues at block 206. Otherwise, the flow loops back to block 202, where the connection establishment unit 108 continues to determine whether the first WLAN device 102 is in the idle operating mode and whether RF saturation is detected at the first WLAN device 102.

At block 206, the first WLAN device switches from the idle operating mode to the active device discovery mode. The flow 200 moves from block 204 to block 206 in response to determining that the first WLAN device 102 is configured in the idle operating mode and that RF saturation was detected at the first WLAN device 102. In the active device discovery mode, the first WLAN device 102 can actively transmit messages and receive messages to identify other WLAN devices in the wireless communication network 100 and to establish a communication link with one or more of the identified WLAN devices. For example, in the active device discovery mode, the device detection unit 106 can initiate a device scanning process for discovering one or more WLAN devices in the wireless communication network 100. The device detection unit 106 can broadcast one or more control messages (e.g., probe request messages, beacon messages, etc.) to other WLAN devices in the wireless communication network 100 to indicate the presence of the first WLAN device 102. Transmitting one or more control messages to the other WLAN devices can cause at least one of the other WLAN devices (e.g., the second WLAN device 112) to similarly detect (as will be described below in blocks 208-214) the first WLAN device 102. The flow continues at block 208.

At block 208, the first WLAN device determines the signal strength associated with one or more RF signals received from the second WLAN device of the wireless communication network. For example, the device detection unit 106 can determine that the received signal strength indicator (RSSI) associated with one or more RF signals received from the second WLAN device 112. As another example, the device detection unit 106 can determine the amplitude associated with the one or more received RF signals, the square of the amplitude associated with the one or more received RF signals, the energy/power associated with the one or more received RF signals, and/or other suitable measure of the signal strength. In some implementations, an AGC unit (or another suitable signal strength calculation unit) of the first WLAN device 102 can determine the RSSI (or other suitable measure of the signal strength). The signal strength calculation unit can provide a notification of the signal strength to the device detection unit 106. The flow continues at block 210.

At block 210, it is determined whether the signal strength associated with the second WLAN device is greater than a signal strength threshold. For example, the device detection unit 106 can determine whether the RSSI associated with the second WLAN device 112 is greater than an RSSI threshold. In some implementations, the RSSI threshold can be determined based, at least in part, on the WLAN communication protocol specification. For example, the WLAN communication protocol specification may indicate that a WLAN receiver unit should be capable of detecting and receiving RF signals that are associated with an RSSI of −20 dBm or lower in the 2.4 GHz communication band. Accordingly, in this example, the RSSI threshold can be the maximum detectable RSSI level indicated by the WLAN communication protocol specification (e.g., −20 dBm). In other implementations, the RSSI threshold can be any suitable value that is greater than the maximum detectable RSSI level indicated by the WLAN communication protocol specification. In some implementations, the RSSI threshold can be initially configured based, at least in part, on the threshold detection distance 116. The RSSI threshold can then be dynamically adjusted based on path loss and interference in the wireless communication network 100, typical transmit power levels, ability to detect RF signals with high RSSI, number of WLAN devices in the wireless communication network 100, and/or other such factors. The RSSI threshold can also be selected/adjusted to minimize false detection (and false connection) between the WLAN devices 102 and 112. Comparing the RSSI associated with the second WLAN device 112 (determined at block 208) against the RSSI threshold can enable the device detection unit 106 to determine whether the second WLAN device 112 is proximate to the first WLAN device 102. For example, if the RSSI associated with the second WLAN device 112 is greater than the RSSI threshold, this can indicate that the second WLAN device 112 is within the threshold detection distance 116 of the first WLAN device 102. If it is determined that the signal strength associated with the second WLAN device 112 is greater than the signal strength threshold, the flow continues at block 214. Otherwise, the flow continues at block 212.

At block 212, it is determined that the second WLAN device is not within the threshold detection distance of the first WLAN device. In response to determining that the signal strength associated with the second WLAN device 112 is less than the signal strength threshold (at block 210), the device detection unit 106 can determine that the second WLAN device 112 is not within the threshold detection distance 116 of the first WLAN device 102. Consequently, the first WLAN device 102 can determine not to establish a communication link with the second WLAN device 112. From block 212, the flow ends.

At block 214, it is determined that the second WLAN device is within the threshold detection distance of the first WLAN device. In response to determining that the signal strength associated with the second WLAN device 112 is greater than or equal to the signal strength threshold (at block 210), the device detection unit 106 can determine that the second WLAN device 112 is within the threshold detection distance 116 of the first WLAN device 102. After the first and the second WLAN devices detect that they are within the threshold detection distance of each other and determine to establish the communication link, operations described below in blocks 216-226 can be executed to exchange security information and to establish the communication link. The flow continues at block 216 in FIG. 3.

At block 216 in FIG. 3, the transmit power associated with the first WLAN device is decreased from a predetermined normal transmit power level to a predetermined low transmit power level. The flow 200 moves from block 214 to block 216 after the second WLAN device 112 is deemed to be within the threshold detection distance 116 of the first WLAN device 102. In response to determining to establish the communication link with the second WLAN device 112, the connection establishment unit 108 can cause the first WLAN device 102 to decrease the transmit power to a predetermined low transmit power level (e.g., −60 dBm). The predetermined low transmit power level may be calculated based, at least in part, on the ability of the first WLAN device 102 to transmit at low power levels, the lowest power level at which the first WLAN device 102 can transmit, path loss and interference in the wireless communication network 100, the minimum RSSI which can be detected at the second WLAN device 112, and/or other such factors. In some implementations, the predetermined low transmit power level may also be calculated based, at least in part, on the threshold detection distance 116. For example, the predetermined low transmit power level may be calculated so that any WLAN device outside the threshold detection distance 116 is unable to receive the subsequently exchanged messages. As another example, the predetermined low transmit power level may be calculated so that any WLAN device outside the threshold detection distance 116 may receive, but may be unable to process, the subsequently exchanged messages. In other implementations, the predetermined low transmit power level may be calculated based, at least in part, on another suitable distance that may be less than or greater than the threshold detection distance 116. In some implementations, in response to determining that the second WLAN device 112 is within the threshold detection distance 116 of the first WLAN device 102, the device detection unit 106 can set a flag to indicate that the transmit power associated with the first WLAN device 102 should be decreased. In some implementations, when at a close proximity, reducing the transmit power associated with the first WLAN device 102 from the normal transmit power level (which may be within a range of normal transmit power levels) to the predetermined low transmit power level may also allow packets transmitted by the first WLAN device 102 to be properly received by the second WLAN device 112 (e.g., without causing RF saturation that can prevent decoding). Furthermore, reducing the transmit power associated with the first WLAN device 102 to the predetermined low transmit power level can also preclude eavesdropping by other devices in the wireless communication network 100. In some implementations, the connection establishment unit 108 may also store an identifier (e.g., a network address) associated with the second WLAN device 112. The connection establishment unit 108 can decrease the transmit power associated with the first WLAN device 102 (e.g., a transmitter component or amplifier component) so that subsequent RF signals are transmitted at the predetermined low transmit power level. In some implementations, the connection establishment unit 108 can switch off the analog gain (or disable one or more analog amplifiers) associated with the transmitter unit of the first WLAN device 102 to decrease the transmit power to the predetermined low transmit power level. It is noted that in other implementations, the connection establishment unit 108 can decrease the transmit power associated with the first WLAN device 102 using other suitable techniques. The flow continues at block 218.

At block 218, device credentials associated with the first WLAN device are transmitted to the second WLAN device at the predetermined low transmit power level. For example, the connection establishment unit 108 can transmit (or can cause the transmitter unit of the first WLAN device to transmit) one or more device credentials associated with the first WLAN device 102 to the second WLAN device 112. In some implementations, the first WLAN device 102 may be configured to establish a secure communication link with the second WLAN device 112 using Wi-Fi protected setup (WPS) protocols. In this implementation, the device credentials associated with the first WLAN device 102 can comprise WPS credentials such as WPS personal identification number (PIN) credentials, WPS push button credentials, etc. In other implementations, prior to transmitting the device credentials, the connection establishment unit 108 can negotiate (with the second WLAN device 112) the communication protocols and security protocols that will be employed to establish the communication link. In this implementation, the device credentials associated with the first WLAN device 102 can comprise other suitable information depending on the communication protocols that will be employed to establish the communication link. As indicated above, the connection establishment unit 108 can transmit the device credentials associated with the first WLAN device 102 at the predetermined low transmit power level for proper decoding at the second WLAN device 112 and for security.

In some implementations, the connection establishment unit 108 can transmit the device credentials associated with the first WLAN device 102 in response to receiving a request for the device credentials from the second WLAN device 112. The request for the device credentials can comprise a list of credentials that should be provided for establishing the communication link. In another implementation, the connection establishment unit 108 can automatically transmit the device credentials associated with the first WLAN device 102 after the transmit power level is reduced (instead of waiting to receive a request from the second WLAN device 112). For example, the connection establishment unit 108 can automatically transmit the security information associated with the first WLAN device 102 based on previously received communication protocol information (e.g., received in the RF signal received at block 201). In another implementation, the connection establishment unit 108 can first receive the device credentials associated with the second WLAN device 112 and can then transmit the corresponding device credentials associated with the first WLAN device 102. The flow continues at block 220.

At block 220, device credentials associated with the second WLAN device are received at the first WLAN device. For example, the connection establishment unit 108 can receive one or more device credentials associated with the second WLAN device 112. As described above in block 218, the device credentials associated with the second WLAN device 112 can comprise WPS PIN credentials, WPS push button credentials, or other suitable information depending on the communication protocols that will be employed to establish the communication link. In some implementations, the connection establishment unit 108 can receive the device credentials associated with the second WLAN device 112 in response to transmitting a request for the device credentials to the second WLAN device 112. In another implementation, the second WLAN device 112 can automatically transmit the device credentials to the first WLAN device 102, instead of waiting to receive a request from the first WLAN device 102. Furthermore, in some embodiments, the second WLAN device 112 can also transmit its device credentials using a predetermined low transmit power level for proper decoding (e.g., without causing RF saturation) at the first WLAN device 102 and for security. The flow continues at block 222.

At block 222, the transmit power associated with the first WLAN device is increased from the predetermined low transmit power level to the predetermined normal transmit power level. For example, the connection establishment unit 108 can increase the transmit power associated with the first WLAN device 102 to the predetermined normal transmit power level after device credentials associated with the first and the second WLAN devices are exchanged. In some implementations, after the device credentials are exchanged, the connection establishment unit 108 may provide a notification (e.g., for presentation by a display unit associated with the first WLAN device 102) indicating that the communication link between the first WLAN device 102 and the second WLAN device 112 is being established. For example, the connection establishment unit 108 can cause the display unit to present a notification that states, "Connecting to the WLAN device 112." In another implementation, after the device credentials are exchanged, the connection establishment unit 108 may provide a notification indicating that the first and the second WLAN devices can be moved away from each other. In other words, after the device credentials are exchanged, the connection establishment unit 108 may provide a notification indicating that the user is not required to hold the first WLAN device 102 in close proximity with the second WLAN device 112 (or vice versa). For example, the connection establishment unit 108 can cause a display unit to present a notification that states, "Connecting to the WLAN device 112. Please move the WLAN device 102 away from the WLAN device 112 to continue to connect with the WLAN device 112." The connection establishment unit 108 can then increase the transmit power associated with the first WLAN device 102 to the predetermined normal transmit power level (or to another suitable transmit power level that is greater than the predetermined low transmit power level). In some implementations, the connection establishment unit 108 can switch on the analog gain (or enable one or more previously disabled analog amplifiers) associated with the transmitter unit of the first WLAN device 102 to increase the transmit power. It is noted that in other implementations, the connection establishment unit 108 can vary the transmit power using other suitable techniques. Increasing the transmit power of the first WLAN device 102 can allow subsequently transmitted signals to be received by the second WLAN device 112 (after the WLAN devices 102 and 112 are no longer within the threshold detection distance 116 of each other) for establishment of the communication link between the first and the second WLAN devices. The flow continues at block 224.

At block 224, a peer-to-peer communication link is established with the second WLAN device based, at least in part, on the exchanged device credentials. For example, the connection establishment unit 108 can establish the peer-to-peer communication link between the first WLAN device 102 and the second WLAN device 112 based, at least in part, on the device credentials exchanged at blocks 218 and 220. In some implementations, the first WLAN device 102 and the second WLAN device 112 can exchange connection establishment messages for establishing the communication link and for determining communication channel parameters (e.g., data rate) on a predetermined default communication channel (e.g., specified by the communication protocol being employed). In other implementations, the first WLAN device 102 and the second WLAN device 112 can negotiate and agree upon the communication channel via which to exchange the connection establishment messages. Depending on the communication protocol being employed and the implementation of the first and the second WLAN devices, the first WLAN device 102 and the second WLAN device 112 may or may not exchange the connection establishment messages on the same communication channel on which the device credentials were exchanged. Thus, the peer-to-peer communication link can be automatically established between the first WLAN device 102 and the second WLAN device 112 and requiring little to no manual intervention. In one example, as described above, to establish the peer-to-peer communication link between the first WLAN device 102 and the second WLAN device 112, the user may only need to bring one of the WLAN devices within the threshold detection distance of the other WLAN device. As another example, the user may only need to press a button on one/both of the WLAN devices to initiate operations for establishing the peer-to-peer communication link between the first WLAN device 102 and the second WLAN device 112. The flow continues at block 226.

At block 226, the first WLAN device communicates with the second WLAN device via the peer-to-peer communication link. From block 226, the flow ends.

It is noted that in some implementations, the connection establishment unit 108 can determine whether RF saturation is detected at the first WLAN device 102 in response to determining that the first WLAN device is configured in the idle operating mode (as described above in blocks 202 and 204 of FIG. 2). In other implementations, the connection establishment unit 108 may continuously (or periodically) determine whether RF saturation is detected at the first WLAN device 102. In response to detecting RF saturation at the first WLAN device 102, the connection establishment unit 108 can determine whether the first WLAN device 102 is configured in the idle operating mode. If so, the connection establishment unit 108 can switch to the active device discovery mode and can execute operations subsequently described in blocks 208-226 of FIGS. 2 and 3.

FIGS. 2 and 3 are described from the perspective of the first WLAN device 102 (e.g., the first WLAN device 102 detecting a high RSSI based on transmissions from the second WLAN device 112, the first WLAN device 102 establishing a communication link with the second WLAN device, etc.). However, it is noted that the second WLAN device 112 can also execute operations described above in FIGS. 2 and 3 for detecting a high RSSI based on transmissions of the first WLAN device 102, determining to establish a communication link with the first WLAN device 102, and accordingly establishing the communication link.

In some embodiments, as described with reference to FIGS. 2 and 3, the first and the second WLAN devices may be capable of detecting packets with a relatively high RSSI that is greater than the RSSI indicated by the WLAN communication protocol specification (e.g., RSSI greater than −20 dBm). In some embodiments, as described with reference to FIGS. 2 and 3, the first and the second WLAN devices may be capable of detecting and decoding the received packets with a relatively high RSSI even under strong RF saturation. However, in some embodiments, the first WLAN device 102 and the second WLAN device 112 may be incapable of (or be ineffective in) detecting and decoding packets under strong RF saturation. In these embodiments, the first and the second WLAN devices can be configured to execute operations described in FIGS. 4 and 5 for proximity-based communication link establishment.

Figure 4:
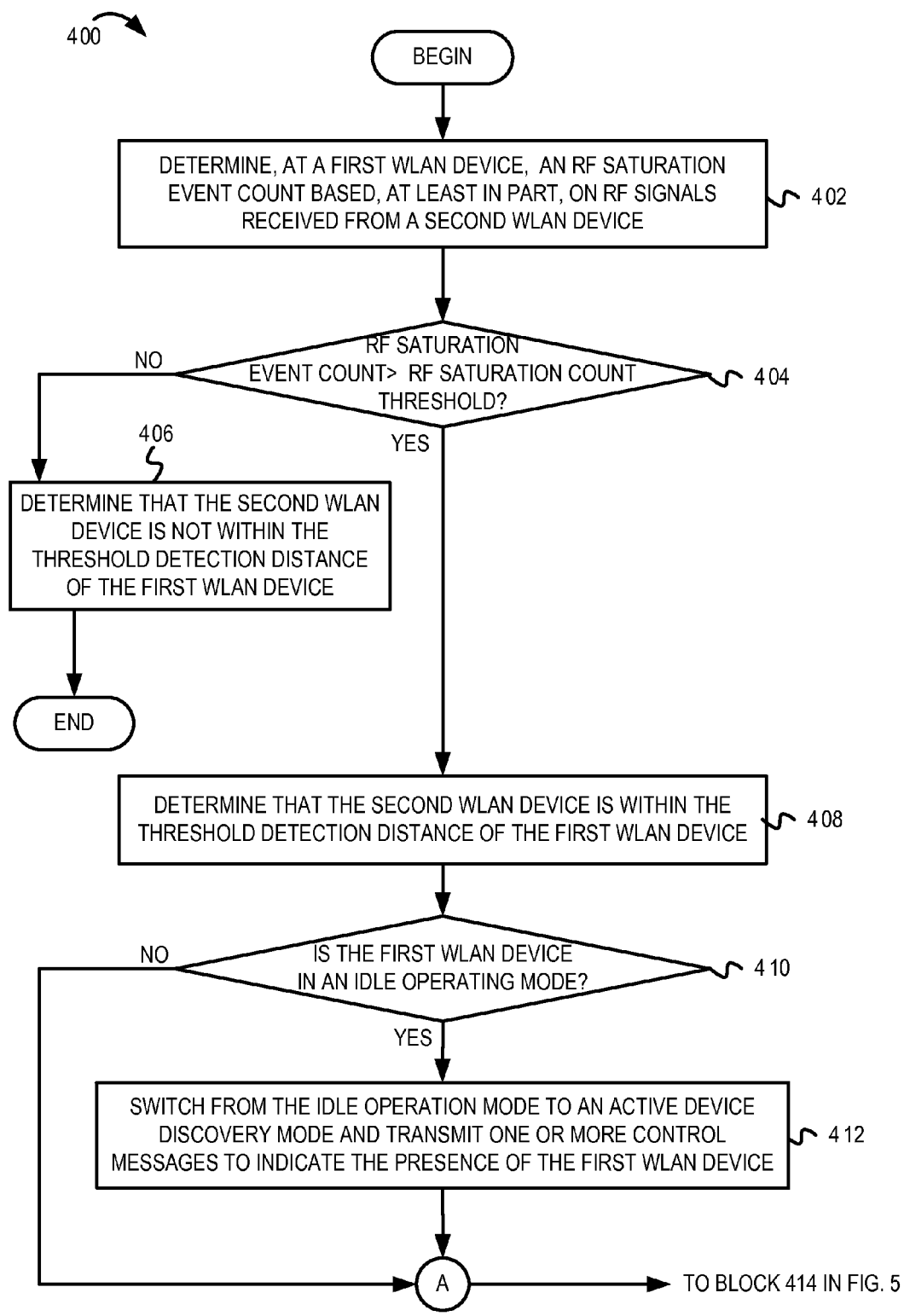
FIG. 4 is a flow diagram illustrating example operations of another embodiment of a proximity-based connection establishment mechanism.
Figure 5:
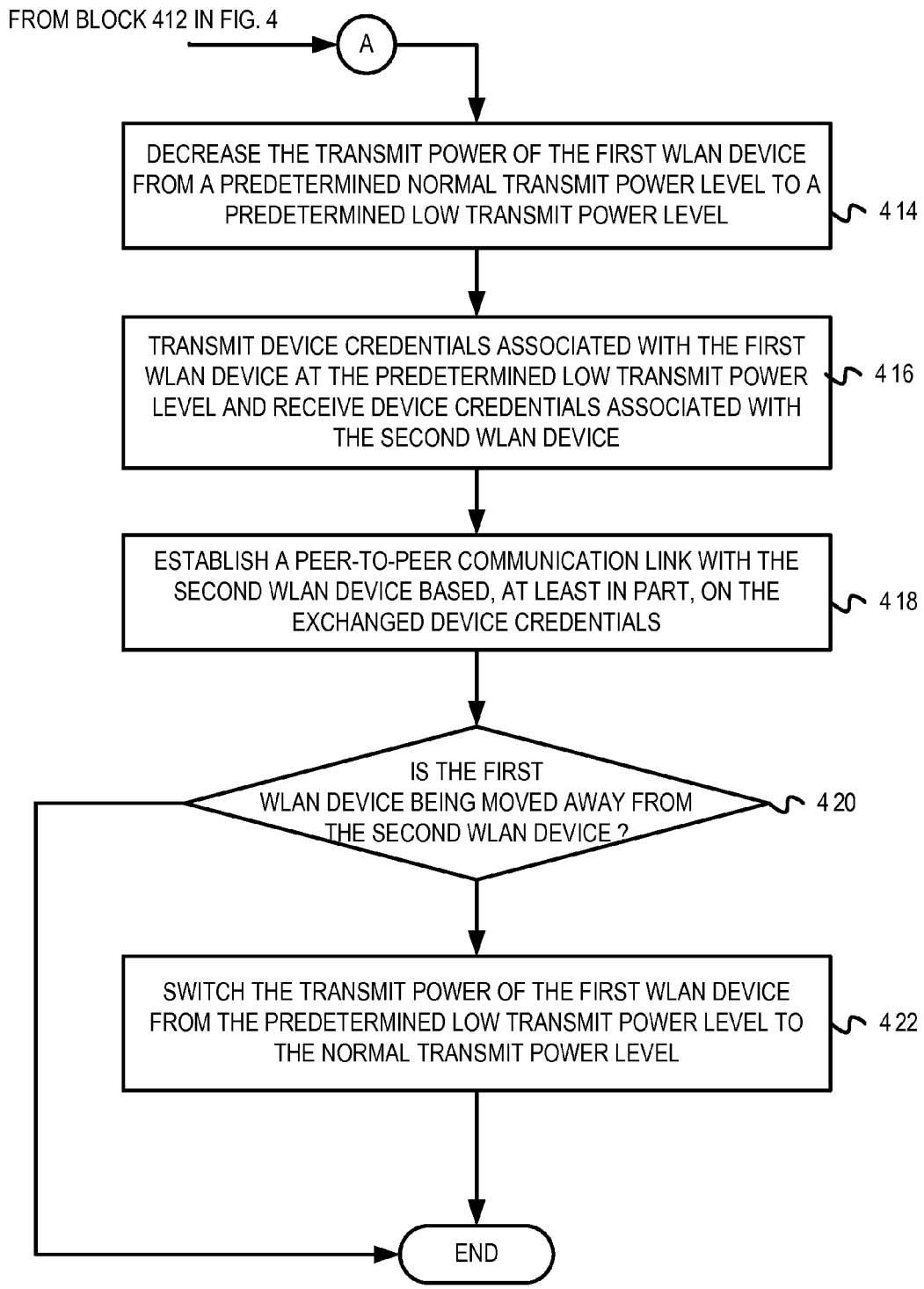
FIG. 5 is a continuation of FIG. 4 and also illustrates example operations of another embodiment of a proximity-based connection establishment mechanism.

FIG. 4 and FIG. 5 depict a flow diagram 400 illustrating example operations of another embodiment of a proximity-based connection establishment mechanism. The flow 400 begins at block 402 in FIG. 4.

At block 402, a first WLAN device of a wireless communication network determines an RF saturation event count based, at least in part, on one or more RF signals received from a second WLAN device of the wireless communication network. In some implementations, the first WLAN device and the second WLAN device can be configured in a P2P operating mode and can execute operations described herein to establish a peer-to-peer communication link. With reference to the example of FIG. 1, the device detection unit 106 of the WLAN device 102 can determine the RF saturation event count associated with one or more RF signals received from the second WLAN device 112. In some implementation, an RF saturation event may be detected each time an incoming RF signal (comprising a received packet) saturates the RF front end of the first WLAN device 102. In some implementations, the RF gain associated with an incoming RF signal can be analyzed to determine whether the incoming RF signal caused RF saturation at the first WLAN device 102. For example, if RF gain associated with the incoming RF signal is greater than the RF gain associated with a last received RF signal by a gain difference threshold (e.g., 15 dBm), it may be determined that the incoming RF signal caused RF saturation at the first WLAN device 102. As another example, if the RF gain associated with the incoming RF signal is greater than a predetermined gain threshold (e.g., −20 dBm), it may be determined that the incoming RF signal caused RF saturation at the first WLAN device 102. In one example, the first WLAN device 102 can comprise an AGC history buffer, which may be implemented in hardware and/or software. The RF saturation events may be stored in the AGC history buffer. It is noted that in other examples, the RF saturation events may be recorded in other suitable buffers, memory, or data structures.

The device detection unit 106 can determine the RF saturation event count (e.g., by reading the AGC history buffer) at predetermined periodic intervals (e.g., every beacon interval, twice every beacon interval, etc.). The RF saturation event count can indicate the number of RF saturation events that were detected at the first WLAN device 102. In some implementations, the RF saturation event count can be an accumulation of RF saturation events (i.e., the total number of RF saturation events) that were detected at the first WLAN device 102 over a predetermined time interval. In another implementation, the RF saturation event count can represent the number of consecutively received packets (within a predetermined time interval) that caused RF saturation at the first WLAN device 102. In other implementations, RF saturation event count can be any suitable indication of when and for how long RF saturation was detected at the first WLAN device 102. The flow continues at block 404.

At block 404, it is determined whether the RF saturation event count associated with the second WLAN device is greater than a RF saturation event count threshold. For example, the device detection unit 106 can determine whether the RF saturation event count associated with the WLAN device 112 is greater than the RF saturation event count threshold. The RF saturation event count threshold can be determined based, at least in part, on the time interval over which the RF saturation event count is accumulated, typical transmit power levels, ability to detect RF saturation, the threshold detection distance 116, number of WLAN devices in the wireless communication network 100, interference and path loss in the wireless communication network 100, and/or other such factors. In some implementations, the RF saturation event count threshold can also be selected to minimize false detection (and false connection) between the WLAN devices 102 and 112. For example, the RF saturation event count threshold can be selected as the minimum number of consecutive packets that should cause RF saturation at the first WLAN device 102 in order to determine that RF saturation was detected at the first WLAN device (e.g., to avoid false detection). In other words, if the RF saturation event count threshold is 3000, the device detection unit 106 can determine that RF saturation was detected at the first WLAN device 102 if the RF saturation event count determined at block 402 is greater than or equal to 3000. If it is determined that the RF saturation event count is greater than the RF saturation event count threshold, the flow continues at block 408. Otherwise, the flow continues at block 406.

At block 406, it is determined that the second WLAN device is not within the threshold detection distance of the first WLAN device. In response to determining that the RF saturation event count associated with the second WLAN device 112 is less than the RF saturation event count threshold (at block 404), the device detection unit 106 can determine that the second WLAN device 112 is not within the threshold detection distance 116 of the first WLAN device 102. The first WLAN device 102 (e.g., the connection establishment unit 108) can determine not to establish a communication link with the second WLAN device 112. From block 406, the flow ends.

At block 408, it is determined that the second WLAN device is within the threshold detection distance of the first WLAN device. In response to determining that the RF saturation event count associated with the second WLAN device 112 is greater than or equal to the RF saturation event count threshold (at block 404), the device detection unit 106 can determine that the second WLAN device 112 is within the threshold detection distance 116 of the first WLAN device 102. The flow continues at block 410.

At block 410, it is determined whether the first WLAN device is configured in an idle operating mode. As described above with reference to block 202 of FIG. 2, the connection establishment unit 108 can determine whether the first WLAN device 102 is configured in the idle operating mode. If the first WLAN device 102 is configured in the idle operating mode, the flow continues at block 412. Otherwise, the flow continues at block 414 in FIG. 5.

At block 412, the first WLAN device switches from the idle operating mode to an active device discovery mode. The flow 400 moves from block 410 to block 412 in response to determining that the first WLAN device 102 is configured in the idle operating mode and that RF saturation was detected at the first WLAN device 102. Additionally, in response to switching to the active device discovery mode, the connection establishment unit 108 can transmit a predetermined number of control messages (e.g., probe requests, probe responses, and other suitable transmissions), to advertise the presence of the first WLAN device 102 and to cause RF saturation at the second WLAN device 112. In some implementations, the predetermined number of control messages can be greater than or equal to the RF saturation event count threshold. For example, if the RF saturation event count threshold is 3000, the connection establishment unit 108 can transmit at least 3000 control messages to cause RF saturation at the second WLAN device 112. The second WLAN device 112 can similarly detect (as described above in blocks 402-408) the first WLAN device 102 based on the transmitted control messages. The flow continues at block 414 in FIG. 5.

At block 414, the transmit power associated with the first WLAN device is decreased from a predetermined normal transmit power level to a predetermined low transmit power level. The flow 400 moves to block 414 after the second WLAN device 112 is deemed to be within the threshold detection distance 116 of the first WLAN device 102. In some implementations, prior to decreasing the transmit power associated with the first WLAN device 102, the user can be prompted to press a "connect" button to activate operations for establishing the communication link to minimize/eliminate false connection between the WLAN devices 102 and 112. The detection unit 106 can prompt the connection establishment unit 108 to exchange device credentials with the second WLAN device 112 and to establish a communication link with the second WLAN device 112, as will be further described below. In other implementations, the operations for establishing the communication link can be automatically executed without requiring the user to press a button. As described above, the one or more RF signals transmitted at the normal transmit power level from the second WLAN device 112 resulted in RF saturation at the first WLAN device 102 and consequently in detection of the second WLAN device 112. However, because the one or more RF signals transmitted at the normal transmit power level from the second WLAN device 112 resulted in RF saturation at the first WLAN device 102, the first WLAN device 102 may be unable to properly decode (e.g., extract useful information from) packets that constitute the one or more RF signals. Similarly, any RF signals transmitted at the normal transmit power level from the first WLAN device 102 would result in RF saturation at the second WLAN device 112, making it difficult (or impossible) for the second WLAN device 112 to properly decode the received RF signals. Therefore, after the second WLAN device 112 is determined to be within the threshold detection distance 116 of the first WLAN device 102, the connection establishment unit 108 can decrease the transmit power associated with the first WLAN device 102 to the predetermined low transmit power level. This can help ensure that transmissions from the first WLAN device 102 do not cause RF saturation at the second WLAN device 112. In some implementations, the connection establishment unit 108 may also record an identifier (e.g., a network address) associated with the second WLAN device 112. After the connection establishment unit 108 decreases the transmit power associated with the first WLAN device 102 so that subsequent signals are transmitted at the predetermined low transmit power level, the flow continues at block 416.

At block 416, device credentials associated with the first WLAN device are transmitted at the predetermined low transmit power level and device credentials associated with the second WLAN device are received. As described above in block 218 of FIG. 3, the connection establishment unit 108 can transmit one or more device credentials associated with the first WLAN device 102 to the second WLAN device 112 at the predetermined low transmit power level. The connection establishment unit 108 can also receive one or more device credentials associated with the second WLAN device 112. As described above in block 222 of FIG. 3, in some implementations, after the first WLAN device 102 and the second WLAN device 112 exchange their respective device credentials, the connection establishment unit 108 can present (e.g. in a display unit) a notification indicating that the communication link is being established and/or instructing the user to move the first and the second WLAN devices away from each other.

It is noted that, in the flow 400 of FIGS. 4 and 5, the first WLAN device 102 and the second WLAN device 112 may be configured to detect RF saturation and may be unable to receive or decode RF signals associated with an RSSI that is greater than the maximum RSSI specified by the WLAN communication protocol. Therefore, increasing the transmit power associated with the first WLAN device 102 from the predetermined low transmit power level to a higher transmit power level (as described above in block 222 of FIG. 4) may result in RF saturation at the second WLAN device 112. This can also result in the second WLAN device 112 being unable to detect and decode the RF signals received from the first WLAN device, making it difficult to reliably exchange information to establish the communication link. Consequently, increasing the transmit power associated with the first WLAN device 102 from the predetermined low transmit power level to a higher transmit power level can prevent the communication link from being established. Therefore, to prevent RF saturation and improper packet decoding at the first and the second WLAN devices, the connection establishment unit 108 may not increase the transmit power associated with the first WLAN device 102 to the normal transmit power level until the first and the second WLAN devices are sufficiently separated from each other (e.g., by the threshold detection distance 116, by a distance that is greater than the threshold detection distance 116, etc.). As will be further described below in blocks 420 and 422, the first WLAN device 102 can implement functionality to determine whether/when to increase the transmit power. The flow continues at block 418.

At block 418, a peer-to-peer communication link is established with the second WLAN device based, at least in part, on the exchanged device credentials. For example, the connection establishment unit 108 can initiate operations to establish the peer-to-peer communication link between the first WLAN device 102 and the second WLAN device 112 based, at least in part, on the device credentials exchanged at block 418. The flow continues at block 420.

At block 420, it is determined whether the first WLAN device is being moved away from the second WLAN device. In some implementations, the connection establishment unit 108 can determine whether the first WLAN device 102 is being moved away from the second WLAN device 112 by determining whether packets from the second WLAN device 112 are being received at the first WLAN device 102. In another implementation, the connection establishment unit 108 can determine (at predetermined intervals of time) whether the first WLAN device 102 abruptly stopped receiving packets from the second WLAN device 112. For example, if the connection establishment unit 108 stops receiving acknowledgement (ACK) messages from the second WLAN device 112, this can indicate that the first WLAN device 102 and the second WLAN device 112 are being moved away from each other. In another implementation, to determine whether the first WLAN device 102 is being moved away from the second WLAN device 112, the connection establishment unit 108 can determine whether the RSSI associated with RF signals received from the second WLAN device 112 is progressively decreasing or whether the RSSI associated with RF signals received from the second WLAN device 112 has dropped below a RSSI detection threshold. In another implementation, the connection establishment unit 108 can determine whether other performance measurements (e.g., packet error rate) have dropped below their corresponding performance measurement thresholds to determine whether the first WLAN device 102 is being moved away from the second WLAN device 112. In another implementation, the connection establishment unit 108 can analyze the data transmission rate to determine whether the first WLAN device 102 is being moved away from the second WLAN device 112. For example, if the first WLAN device 102 and the second WLAN device 112 are moved away from each other, the data transmission rate can drop by five or more modulation and coding scheme (MCS) rates (e.g., from level M6 to level M1 or level M0). If it is determined that the first WLAN device 102 is being moved away from the second WLAN device 112, the flow continues at block 422. Otherwise, the flow ends. Although FIG. 5 depicts the flow 400 ending if it is determined that the first WLAN device 102 is not being moved away from the second WLAN device 112, it is noted that in some implementations the connection establishment unit 108 can continue to establish the communication link (or communicate) with the second WLAN device 112 at the predetermined low transmit power.

At block 422, the transmit power level associated with the first WLAN device is increased from the predetermined low transmit power level to the predetermined normal transmit power level. The flow 400 moves from block 420 to block 422 after device credentials associated with the first and the second WLAN devices are exchanged (as described in block 418) and if it is determined that the first and the second WLAN devices have been moved away from each other (at block 420). In some implementations, the connection establishment unit 108 can then increase the transmit power associated with the first WLAN device 102 to the predetermined normal transmit power level. In other implementations, the connection establishment unit 108 can then increase the transmit power associated with the first WLAN device 102 to other suitable dynamically configurable (e.g., based on the distance between the first WLAN device 102 and the second WLAN device 112) transmit power level that is higher than the predetermined low transmit power level. As described above in block 222 of FIG. 3, the connection establishment unit 108 can enable the analog gain (or enable one or more previously disabled analog amplifiers) associated with the first WLAN device 102 to increase the transmit power. From block 422, the flow ends. Although FIG. 5 depicts the flow 400 ending after the transmit power associated with the first WLAN device 102 is increased, it is noted that the connection establishment unit 108 can resume operations for establishing the communication link, or can resume operations for communicating with the second WLAN device 112.

It is noted that in some implementations, the operations described in blocks 420-422 may not be executed after the communication link between the first WLAN device 102 and the second WLAN device 112 is established as depicted in FIG. 5. Instead, the operations described in blocks 420-422 may be repeatedly executed before the communication link is established (e.g., after the device credentials are exchanged), while the communication link is being established, after the communication link is established, etc. For example, after the device credentials are exchanged, the connection establishment unit 108 can determine (at predetermined intervals of time) whether the first WLAN device 102 is being moved away from the second WLAN device 112, as described above in block 420. As another example, a dedicated monitoring process can continuously monitor the RF signals being received from the second WLAN device 112 to determine whether the first WLAN device 102 is being moved away from the second WLAN device 112. If the monitoring process determines that the first WLAN device 102 is being moved away from the second WLAN device 112, the monitoring process can provide a trigger (or another suitable notification) to accordingly notify the connection establishment unit 108. The connection establishment unit 108, in turn, can increase the transmit power associated with the first WLAN device 102 (as described above in block 422), and can continue executing the operations for establishing the communication link or for communicating with the second WLAN device 112.

It is noted that although FIG. 4 describes the first WLAN device 102 switching from the idle operating mode to the active operating mode (at block 412) and consequently decreasing the transmit power of the first WLAN device 102 (at block 414), embodiments are not so limited. In other embodiments, after the first WLAN device 102 switches from the idle operating mode to the active operating mode (at block 412), the device detection unit 106 can attempt to again determine whether RF saturation is detected at the first WLAN device 102. In other words, after the first WLAN device 102 switches to the active device discovery mode (at block 412), the device detection unit 106 can execute operations described above in blocks 402-408 to determine whether RF saturation is detected at the first WLAN device 102 and to identify the WLAN device that caused the RF saturation at the first WLAN device 102 (e.g., the second WLAN device 112). After it is determined that RF saturation was detected at the first WLAN device 102 because of one or more RF signals transmitted by the second WLAN device 112, the connection establishment unit 108 can execute operations described in blocks 414-422 to establish the communication link with the second WLAN device 112.

FIGS. 4 and 5 are described from the perspective of the first WLAN device 102 (e.g., the first WLAN device 102 detecting RF saturation based on transmissions from the second WLAN device 112 and consequently establishing a communication link with the second WLAN device 112, etc.). However, it is noted that the second WLAN device 112 can also execute operations described above in FIGS. 4 and 5 for detecting RF saturation based on transmissions of the first WLAN device 102, determining to establish a communication link with the first WLAN device 102, and accordingly establishing the communication link.

It should be understood that FIGS. 1-5 are examples meant to aid in understanding embodiments and should not be used to limit embodiments or limit scope of the claims. Embodiments may comprise additional circuit components, different circuit components, and/or may perform additional operations, fewer operations, operations in a different order, operations in parallel, and some operations differently. Furthermore, it is noted that although FIG. 2 depicts the operations of the flow 200 being triggered in response to receiving an RF signal from the second WLAN device 112, embodiments are not so limited. In other embodiments, the first WLAN device 102 can periodically determine whether the first WLAN device 102 is in the idle operating mode and whether RF saturation is detected at the first WLAN device 102 without specifically waiting for a trigger in the form of an RF signal from another WLAN device.

In some embodiments as depicted in FIG. 2, the signal strength associated with an RF signal received from the second WLAN device 112 can be analyzed to determine (at the first WLAN device 102) whether the second WLAN device 112 is in close proximity to the first WLAN device 102. In other embodiments, however, the first WLAN device 102 can employ a combination of the signal strength (described in FIG. 2) and the RF saturation event count (described in FIG. 4) to determine whether the second WLAN device 112 is in close proximity to the first WLAN device 102.

Although the FIGS. 1-5 describe a normal power level and a low power level, it is noted that the first WLAN device 102 (and the second WLAN device 112) can be associated with multiple normal power levels and multiple low power levels. In some implementations, the normal power level can be selected from a plurality of normal power levels, and likewise, the low power level can be selected from a plurality of low power levels. In other implementations, the normal power level can be any suitable power level within a range of normal power levels. Likewise, the low power level can be any suitable power level within a range of low power levels. It is also noted, that in some implementations, a slight variation in the normal power level may be acceptable as long as the normal power level remains within the range of normal power levels. Likewise, a slight variation in the low power level may be acceptable as long as the low power level remains within the range of low power levels. Furthermore, although the Figures describe the first WLAN device 102 decreasing its transmit power (e.g., to the low transmit power level) to establish a communication link with second WLAN device 112 that is proximate to the first WLAN device 102, embodiments are not so limited. In other embodiments, the first WLAN device 102 may not decrease its transmit power (e.g., at block 216 of FIG. 3). Instead, the first WLAN device 102 can transmit device credentials and other messages to the second WLAN device 112 at the normal transmit power level (or another suitable transmit power level).

In some scenarios, the first WLAN device 102 may detect multiple WLAN devices within the threshold detection distance 116. In some implementations, the first WLAN device 102 may establish a communication link with all the WLAN devices within the threshold detection distance 116. For example, if there are three WLAN devices within the threshold detection distance 116 of the first WLAN device 102, the first WLAN device 102 may automatically establish a communication link with each of the three WLAN devices. In other implementations, the first WLAN device 102 may establish a communication link with a subset of the WLAN devices within the threshold detection distance 116 based, at least in part, on user input. For example, in response to detecting three WLAN devices within the threshold detection distance 116 of the first WLAN device 102, the first WLAN device 102 can present a notification to the user identifying the three detected WLAN devices and can prompt the user to indicate one or more (or none) of the detected WLAN devices with which to establish the communication link. As another example, the first WLAN device 102 can automatically select one of the WLAN devices or a subset of the WLAN devices without user input based on the order in which the WLAN devices were discovered, based on priority associated with the WLAN devices, and/or other such criteria.

Although examples describe both the first WLAN device 102 and the second WLAN device 112 executing operations described above to detect the other WLAN device and to establish the communication link, embodiments are not so limited. In some embodiments, only one of the WLAN devices 102 may detect the other WLAN device 112 within the threshold detection distance 116 (e.g., based on the RSSI associated with the received RF signals as described in FIGS. 2 and 3 or based on detecting RF saturation as described in FIGS. 4 and 5). The WLAN device 102 may request and receive appropriate device credentials from the WLAN device 112, may establish the communication link with the WLAN device 112, and may provide a "communication link established" notification to the WLAN device 112 after the communication link is established.

Although FIGS. 1-5 describe a proximity-based connection establishment mechanism in a P2P environment, embodiments are not so limited. In other embodiments, the proximity-based connection establishment mechanism described above in FIGS. 1-5 can be extended for automatically establishing a communication link in an infrastructure environment between an access point and a client station. An access point typically broadcasts beacon messages at periodic intervals (e.g., every 100 ms). To connect to the access point, the client station typically transmits a probe request to the access point requesting communication protocol information from the access point and waits for a probe response from the access point. This exchange of messages between the access point and the client station can be used to automatically establish a proximity-based communication link between the access point and the client station. For example, a user can move the client station within the threshold detection distance 116 of the access point. Beacon transmissions from the access point can cause RF saturation at the client station and probe request transmissions from the client station can cause RF saturation at the access point. After the access point and the client station detect each other based on detecting the RF saturation (or an RSSI that is greater than the RSSI threshold), the access point and the client station can execute operations described above for establishing the communication link.

In some implementations, the first WLAN device 102 and the second WLAN device 112 may be configured (e.g., in accordance with the WLAN communication protocol specification) to cycle through (and broadcast device identification information and capabilities on) two or more predetermined communication channels ("social channels") in the device discovery mode to discover other WLAN devices. However, this process can be unpredictable and can increase the amount of time consumed by the WLAN devices to detect each other and determine to establish the communication link. To speed up the device discovery and device detection process, the first WLAN device 102 and the second WLAN device 112 may not cycle through multiple social channels but may instead remain on one social channel. The social channel can be predetermined or can be independently determined by each of the WLAN devices. In other implementations, the first WLAN device 102 and the second WLAN device 112 may not operate on the same communication channel to detect each other and to consequently initiate operations for proximity-based connection establishment. Instead, transmissions from either WLAN device 102 or 112 can cause RF saturation (or detection of a high RSSI signal) at the receiving WLAN device irrespective of whether the WLAN devices 102 and 112 are transmitting/listening for messages on different communication channels as long as the WLAN devices 102 and 112 are operating within the same communication band. For example, the first and the second WLAN devices can detect each other (e.g., based on the RF saturation) even if the first WLAN device 102 operates on channel 1 and the second WLAN device 112 operates on channel 11 as long as the WLAN devices 102 and 112 are operating within the same 2.4 GHz communication band.

In some implementations, the connection establishment unit 108 can execute a different set of operations for establishing the communication link depending on the type of the second WLAN device 112. The connection establishment unit 108 can, based on one or more messages received from the second WLAN device 112, identify the type of the second WLAN device 112 and can accordingly determine how to establish the communication link. For example, in response to detecting beacon messages from the second WLAN device 112, the connection establishment unit 108 can determine that the second WLAN device 112 is an access point and can execute a first set of operations for establishing the communication link with an access point in an infrastructure network. As another example, in response to detecting probe request/response messages from the second WLAN device 112, the connection establishment unit 108 can determine that the second WLAN device 112 is a peer WLAN device (e.g., another client station) and can execute a second set of operations for establishing the communication link with the peer WLAN device in an P2P network.

Finally, although FIGS. 2-3 describe the first WLAN device 102 and the second WLAN device 112 automatically establishing the wireless communication connection if the first WLAN device 102 and the second WLAN device 112 are within the threshold detection distance 116 of each other, embodiments are not so limited. In other embodiments, the user may be prompted to press a "connect" button (on the first WLAN device 102 and/or the second WLAN device 112) to activate operations for establishing the communication link to minimize/eliminate false connection between the WLAN devices 102 and 112.

Embodiments may take the form of an entirely hardware embodiment, a software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a machine-readable storage medium, or a machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions (e.g., executable by one or more processors). A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable signal medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 6:
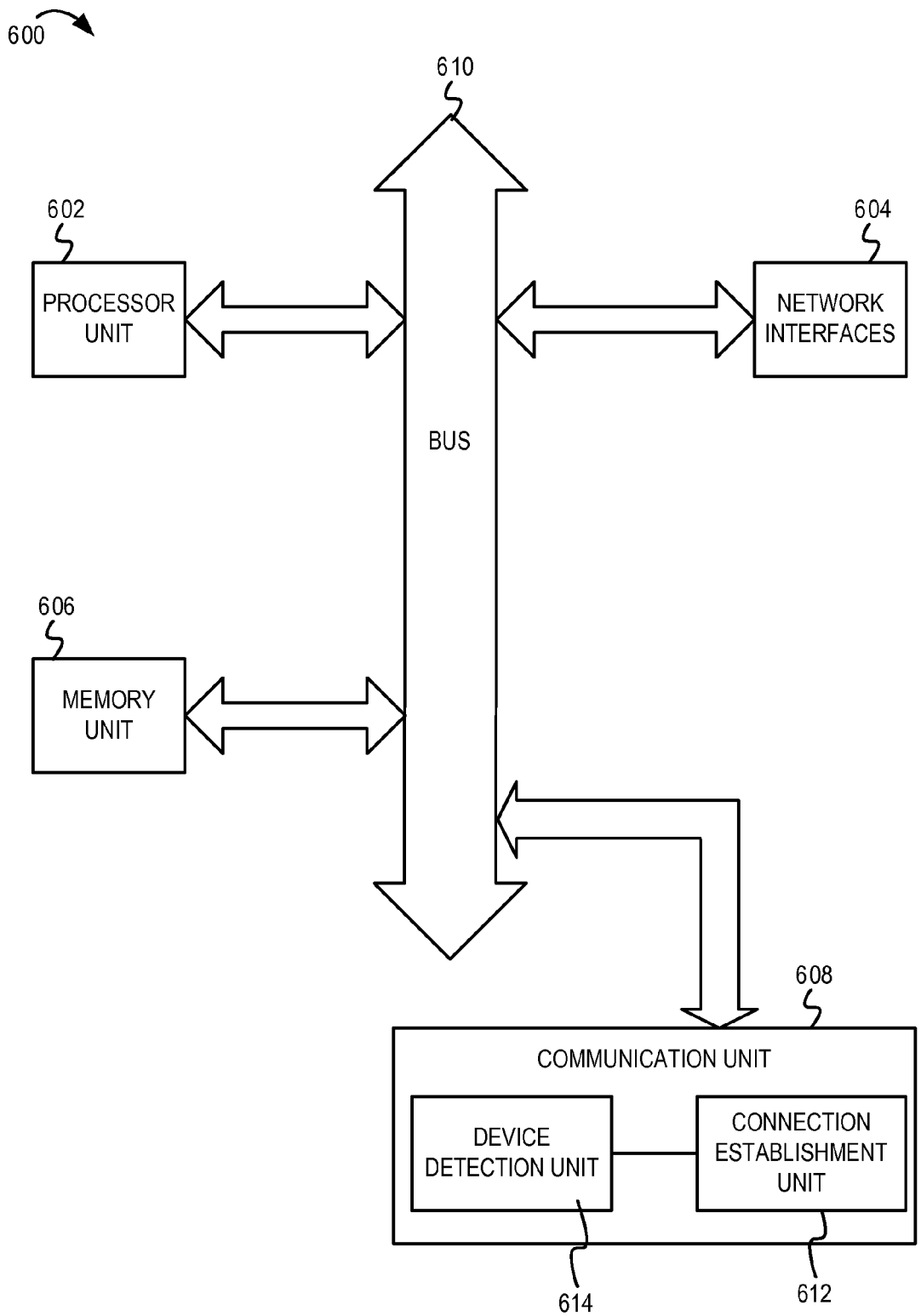
FIG. 6 is a block diagram of one embodiment of an electronic device including a proximity-based connection establishment mechanism in a wireless communication network.

FIG. 6 is a block diagram of one embodiment of an electronic device 600 including a proximity-based connection establishment mechanism in a wireless communication network. In some implementations, the electronic device 600 may be one of a notebook computer, a desktop computer, a tablet computer, a netbook, a mobile phone, a gaming console, a personal digital assistant (PDA), or other electronic systems comprising a WLAN device with wireless communication capabilities. In some implementations, the electronic device 600 can be a standalone WLAN communication device configured to establish a WLAN communication link with another WLAN device (or a WLAN access point). The electronic device 600 includes a processor unit 602 (possibly including multiple processors, multiple cores, multiple nodes, and/or implementing multi-threading, etc.). The electronic device 600 includes a memory unit 606. The memory unit 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 600 also includes a bus 610 (e.g., PCI, ISA, PCI-Express, HyperTransport®, InfiniBand®, NuBus, AHB, AXI, etc.), and network interfaces 604 that include at least one of a wireless network interface (e.g., a WLAN interface, a Bluetooth® interface, a WiMAX interface, a ZigBee® interface, a Wireless USB interface, etc.) and a wired network interface (e.g., an Ethernet interface, etc.).

The electronic device 600 also includes a communication unit 608. The communication unit 608 comprises a connection establishment unit 612 and a device detection unit 614. The device detection unit 614 can detect another WLAN device within a threshold detection distance of the electronic device 600 based on determining that the RSSI associated with received RF signals is greater than a RSSI threshold or based on detecting RF saturation at the electronic device 600, as is further described above in FIGS. 1-5. The connection establishment unit 612 can exchange device credentials with the detected WLAN device at a predetermined low transmit power level and can establish the communication link between the electronic device 600 and the detected WLAN device based, at least in part, on the exchanged device credentials, as is further described above with reference to FIGS. 1-5. Any one of these functionalities may be partially (or entirely) implemented in hardware and/or on the processor unit 602. For example, the functionality may be implemented with an application specific integrated circuit, in logic implemented in the processor unit 602, in a co-processor on a peripheral device or card, etc. Further, realizations may include fewer or additional components not illustrated in FIG. 6 (e.g., video cards, audio cards, additional network interfaces, peripheral devices, etc.). The processor unit 602, the memory unit 606, and the network interfaces 604 are coupled to the bus 610. Although illustrated as being coupled to the bus 610, the memory unit 606 may be coupled to the processor unit 602.

While the embodiments are described with reference to various implementations and exploitations, it will be understood that these embodiments are illustrative and that the scope of the inventive subject matter is not limited to them. In general, proximity-based wireless handshaking techniques for connection establishment as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    determining a signal strength associated with an RF signal received at a first wireless network device from a second wireless network device of a wireless communication network;
    detecting RF saturation at the first wireless network device;
    determining, in response to detecting the RF saturation, whether the second wireless network device is within a threshold detection distance from the first wireless network device based, at least in part, on the signal strength associated with the second wireless network device;
    transmitting a device credential associated with the first wireless network device to the second wireless network device at a reduced transmit power level in response to determining that the second wireless network device is within the threshold detection distance; and
    establishing a communication link between the first wireless network device and the second wireless network device based, at least in part, on the device credential associated with the first wireless network device and a device credential associated with the second wireless network device.

2. The method of claim 1, wherein said determining whether the second wireless network device is within the threshold detection distance comprises:
    comparing the signal strength associated with the second wireless network device against a signal strength threshold to determine whether the signal strength associated with the second wireless network device is greater than the signal strength threshold; and
    in response to determining that the signal strength associated with the second wireless network device is greater than the signal strength threshold, determining that the second wireless network device is within the threshold detection distance.

3. The method of claim 2, wherein in response to determining that the signal strength associated with the second wireless network device is less than the signal strength threshold, the method further comprises:
    determining that the second wireless network device is not within the threshold detection distance; and
    determining to not establish the communication link between the first wireless network device and the second wireless network device.

4. The method of claim 1, wherein, in response to transmitting the device credential associated with the first wireless network device to the second wireless network device at the reduced transmit power level,
- determining whether the first wireless network device is being moved away from the second wireless network device; and
- in response to determining that the first wireless network device is being moved away from the second wireless network device,
  - increasing a transmit power associated with the first wireless network device from the reduced transmit power level to a first transmit power level that is greater than the reduced transmit power level.

5. The method of claim 1, wherein in response to said transmitting the device credential associated with the first wireless network device to the second wireless network device at the reduced transmit power level, the method further comprises:
- increasing a transmit power associated with the first wireless network device from the reduced transmit power level to a first transmit power level that is greater than the reduced transmit power level.

6. The method of claim 1, further comprising:
- determining that the first wireless network device is configured in an idle operating mode;
- in response to determining that the RF saturation is detected at the first wireless network device,
  - switching the first wireless network device from the idle operating mode to an active device discovery mode;
  - transmitting a control message to the second wireless network device in response to said switching the first wireless network device from the idle operating mode to the active device discovery mode; and
  - determining the signal strength associated with the RF signal received at the first wireless network device from the second wireless network device to determine whether the second wireless network device is within the threshold detection distance.

7. The method of claim 1, further comprising:
- receiving a device credential associated with the second wireless network device at the first wireless network device, wherein the device credential associated with the second wireless network device are transmitted to the first network device at a low transmit power level associated with the second wireless network device.

8. The method of claim 1, wherein the signal strength associated with the RF signal received at the first wireless network device from the second wireless network device comprises a received signal strength indicator (RSSI) associated with the RF signal.

9. The method of claim 2, wherein the signal strength threshold is determined based, at least in part, on the threshold detection distance.

10. The method of claim 1, wherein each of the first wireless network device and the second wireless network device comprise a wireless local area network (WLAN) device.

11. A method comprising:
- determining whether RF saturation is detected at a first wireless network device based, at least in part, on an RF signal received from a second wireless network device of a wireless communication network;
- determining that the second wireless network device is within a threshold detection distance from the first wireless network device in response to determining that the RF saturation is detected at the first wireless network device;
- transmitting a device credential associated with the first wireless network device to the second wireless network device at a reduced transmit power level in response to said determining that the second wireless network device is within the threshold detection distance; and
- establishing a communication link between the first wireless network device and the second wireless network device based, at least in part, on the device credential associated with the first wireless network device and a device credential associated with the second wireless network device.

12. The method of claim 11, wherein said determining whether the RF saturation is detected at the first wireless network device further comprises:
- determining an RF saturation event count at the first wireless network device;
- determining whether the RF saturation event count is greater than an RF saturation event count threshold;
- determining that the RF saturation is detected at the first wireless network device, in response to determining that the RF saturation event count is greater than the RF saturation event count threshold; and
- determining that the RF saturation is not detected at the first wireless network device, in response to determining that the RF saturation event count is less than the RF saturation event count threshold.

13. The method of claim 12, wherein the RF saturation event count comprises one of:
- a consecutive number of packets received at the first wireless network device that cause the RF saturation at the first wireless network device; or
- a consecutive number of packets received at the first wireless network device within a predetermined time interval that cause the RF saturation at the first wireless network device.

14. The method of claim 12,
- wherein the RF saturation event count is determined based, at least in part, on accumulating RF saturation events detected at the first wireless network device; and
- wherein the RF saturation events are generated in response to receiving a plurality of packets from the second wireless network device during a predetermined time interval.

15. The method of claim 11, wherein, in response to determining that the RF saturation is detected at the first wireless network device, the method further comprises:
- determining whether the first wireless network device is configured in an idle operating mode;
- in response to determining that the first wireless network device is configured in the idle operating mode,
  - switching the first wireless network device from the idle operating mode to an active device discovery mode; and
  - transmitting a control message to the second wireless network device in response to said switching the first wireless network device from the idle operating mode to the active device discovery mode.

16. The method of claim 11, wherein in response to said transmitting the device credential associated with the first wireless network device to the second wireless network device at the reduced transmit power level, the method further comprises:
- determining whether the first wireless network device is being moved away from the second wireless network device;

in response to determining that the first wireless network device is being moved away from the second wireless network device,
   increasing a transmit power associated with the first wireless network device from the reduced transmit power level to a first transmit power level that is greater than the reduced transmit power level;
   transmitting information to the second wireless network device at the first transmit power level; and
in response to determining that the first wireless network device is not being moved away from the second wireless network device,
   transmitting information to the second wireless network device at the reduced transmit power level.

17. The method of claim 16, wherein said determining whether the first wireless network device is being moved away from the second wireless network device comprises one of:
   determining whether a subsequent packet transmitted from the second wireless network device is being received at the first wireless network device;
   determining whether a received signal strength indicator (RSSI) associated with the subsequent packet received from the second wireless network device is less than a predetermined RSSI detection threshold;
   determining whether a performance measurement associated with the second wireless network device is less than a corresponding performance measurement threshold; and
   determining whether a data transmission rate associated with the first wireless network device has decreased by a predetermined number of data transmission rate levels.

18. A first wireless network device comprising:
   a network interface; and
   a communication unit coupled with the network interface, the communication unit operable to:
      determine a signal strength associated with an RF signal received at the first wireless network device from a second wireless network device;
      detect RF saturation at the first wireless network device;
      determine, in response to detecting the RF saturation, whether the second wireless network device is within a threshold detection distance from the first wireless network device based, at least in part, on the signal strength associated with the second wireless network device;
      transmit a device credential associated with the first wireless network device to the second wireless network device at a reduced transmit power level in response to the communication unit determining that the second wireless network device is within the threshold detection distance; and
      establish a communication link between the first wireless network device and the second wireless network device based, at least in part, on the device credential associated with the first wireless network device and a device credential associated with the second wireless network device.

19. The first wireless network device of claim 18, wherein the communication unit operable to determine whether the second wireless network device is within the threshold detection distance comprises the communication unit operable to:
   compare the signal strength associated with the second wireless network device against a signal strength threshold to determine whether the signal strength associated with the second wireless network device is greater than the signal strength threshold;
   in response to the communication unit determining that the signal strength associated with the second wireless network device is greater than the signal strength threshold, determine that the second wireless network device is within the threshold detection distance; and
   in response to the communication unit determining that the signal strength associated with the second wireless network device is less than the signal strength threshold,
      determine that the second wireless network device is not within the threshold detection distance, and
      determine to not establish the communication link between the first wireless network device and the second wireless network device.

20. The first wireless network device of claim 18, wherein the communication unit is further operable to:
   determine that the first wireless network device is configured in an idle operating mode;
   in response to the communication unit determining that the RF saturation is detected at the first wireless network device,
      switch the first wireless network device from the idle operating mode to an active device discovery mode; and
      transmit a control message to the second wireless network device in response to the communication unit switching the first wireless network device from the idle operating mode to the active device discovery mode; and
   determine the signal strength associated with the RF signal received at the first wireless network device from the second wireless network device to determine whether the second wireless network device is within the threshold detection distance.

21. A first wireless network device comprising:
   a network device; and
   a communication unit coupled with the network device, the communication unit operable to:
      determine whether RF saturation is detected at the first wireless network device based, at least in part, on an RF signal received from a second wireless network device;
      determine that the second wireless network device is within a threshold detection distance from the first wireless network device in response to the communication unit determining that the RF saturation is detected at the first wireless network device;
      transmit a device credential associated with the first wireless network device to the second wireless network device at a reduced transmit power level in response to the communication unit determining that the second wireless network device is within the threshold detection distance; and
      establish a communication link between the first wireless network device and the second wireless network device based, at least in part, on the device credential associated with the first wireless network device and a device credential associated with the second wireless network device.

22. The first wireless network device of claim 21, wherein the communication unit operable to determine whether the RF saturation is detected at the first wireless network device further comprises the communication unit operable to:
   determine an RF saturation event count at the first wireless network device;
   determine whether the RF saturation event count is greater than an RF saturation event count threshold;

determine that the RF saturation is detected at the first wireless network device, in response to the communication unit determining that the RF saturation event count is greater than the RF saturation event count threshold; and determine that the RF saturation is not detected at the first wireless network device, in response to the communication unit determining that the RF saturation event count is less than the RF saturation event count threshold.

23. The first wireless network device of claim 21, wherein, in response to the communication unit determining that the RF saturation is detected at the first wireless network device, the communication unit is further operable to:

determine whether the first wireless network device is configured in an idle operating mode;

in response to the communication unit determining that the first wireless network device is configured in the idle operating mode, switch the first wireless network device from the idle operating mode to an active device discovery mode; and transmit a control message to the second wireless network device in response to the communication unit switching the first wireless network device from the idle operating mode to the active device discovery mode.

24. A non-transitory machine-readable storage medium having instructions stored therein, which when executed by a processor causes the processor to perform operations that comprise:

determining a signal strength associated with an RF signal received at a first wireless network device from a second wireless network device of a wireless communication network;

detecting RF saturation at the first wireless network device;

determining, in response to detecting the RF saturation, whether the second wireless network device is within a threshold detection distance from the first wireless network device based, at least in part, on the signal strength associated with the second wireless network device;

transmitting a device credential associated with the first wireless network device to the second wireless network device at a reduced transmit power level in response to determining that the second wireless network device is within the threshold detection distance; and establishing a communication link between the first wireless network device and the second wireless network device based, at least in part, on the device credential associated with the first wireless network device and a device credential associated with the second wireless network device.

25. The non-transitory machine-readable storage medium of claim 24, wherein said operation of determining whether the second wireless network device is within the threshold detection distance comprises:

comparing the signal strength associated with the second wireless network device against a signal strength threshold to determine whether the signal strength associated with the second wireless network device is greater than the signal strength threshold;

in response to determining that the signal strength associated with the second wireless network device is greater than the signal strength threshold, determining that the second wireless network device is within the threshold detection distance; and in response to determining that the signal strength associated with the second wireless network device is less than the signal strength threshold, determining that the second wireless network device is not within the threshold detection distance, and determining to not establish the communication link between the first wireless network device and the second wireless network device.

26. The non-transitory machine-readable storage medium of claim 24, wherein the operations further comprise:

determining that the first wireless network device is configured in an idle operating mode;

in response to determining that the RF saturation is detected at the first wireless network device, switching the first wireless network device from the idle operating mode to an active device discovery mode;

transmitting a control message to the second wireless network device in response to said operation of switching the first wireless network device from the idle operating mode to the active device discovery mode; and determining the signal strength associated with the RF signal received at the first wireless network device from the second wireless network device to determine whether the second wireless network device is within the threshold detection distance.

* * * * *